JOHN & JACOB STOCK.
Improvement in Photograpic Cameras.
No. 122,785.                                Patented Jan. 16, 1872.
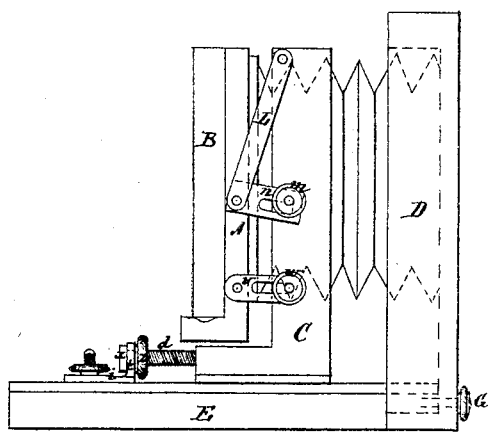
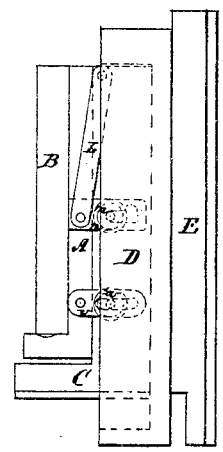
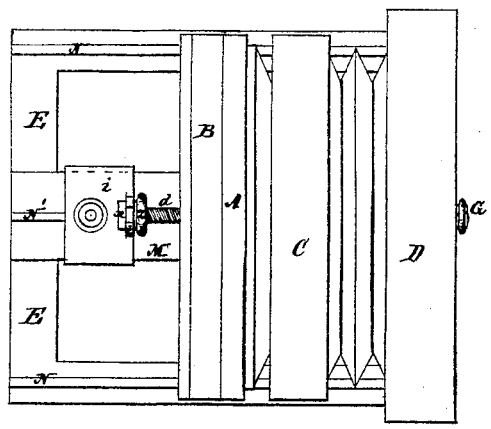
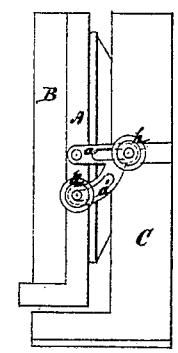
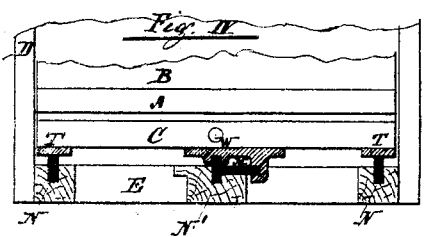
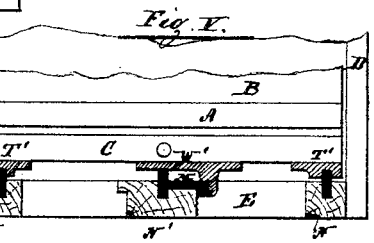
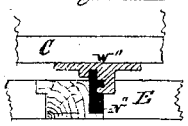

122,785

UNITED STATES PATENT OFFICE.

JOHN STOCK AND JACOB STOCK, OF NEW YORK, N. Y.

IMPROVEMENT IN PHOTOGRAPHIC CAMERAS.

Specification forming part of Letters Patent No. 122,785, dated January 16, 187..

Specification describing certain Improvements in Photographic Cameras, invented by JOHN STOCK and JACOB STOCK, both of the city of New York, in the county and State of New York.

Our invention relates to the construction of cameras in such a manner that the same can be easily taken apart, so as to pack the same in a very small compass for the purpose of easy transportation; and further, in the arrangement of an adjustable swinging frame to which the plate-holder is attached.

In the accompanying drawing, Figure I represents a side elevation embodying our invention. Fig. II is a top view of the same. Fig. III represents the manner of putting the camera together for the purpose of transportation. Fig. IV represents part of a front view of the camera with the sliding bed in section. The other figures will be more particularly referred to in the description.

Similar letters represent similar parts in all the figures.

A C D form the camera-box, and B the plate-holder attached to the part A in the usual manner. E is the sliding bed, inserted into the forward part D, and further secured to the same by means of a suitable screw, G, in the end. Or screws may be arranged in the sides of the forward part D to secure this sliding bed E firmly and rigidly to the part D. The bed E is provided with ways N N N' upon which the part C of the camera is made to slide, and likewise with a side-way, M, by which, in combination either with the way N' or with the ways N N, the part of the box is guided in its forward and backward movement by means of suitable brackets or slides T, T, and W, or T', T', and W'. (See Fig. V.) To the central ways of the bed E a plate, i, is fitted, secured by a suitable set-screw, to which a focus-screw, d, is attached, fitting into the projecting part of the box C, whereby the position of the same can be regulated and fixed at any desired point. This focus-screw d is made with two heads x and z, between which the lug t fast to the plate i fits, and whereby said screw d is held fast lengthwise, but capable of turning so as to operate the box C, as may be desired. To the under side of the box C slides T T are fastened, which slide upon the ways N N, and in the central part a slide, w, is fastened, which partly surrounds the way N' as well as the side-way M, so as to guide thereby the camera-box sidewise instead of guiding the camera by the central way N' and the side-way M. The same may be guided by the ways N N, in combination with the side-way M, as represented in Fig. V, where the side-guides T' embrace the ways N, and the central guide W' slides upon the central way N', and only embraces the side-way M. Or the same may be made as represented in Fig. VII, where the central way N'' is made with two ways, over which the guide W'' fast to the bottom of the box C is fitted, whereby the box is guided in the two directions desired. The part A of the camera-box, to which the plate-holder B is attached, is connected to the box C by means of links L, the upper ends of which are attached near the top of the box C, and the lower ends near the center of the box A. To the lower end another link or strap, n, is fixed, provided with a slot, in which a pin, m, screwed into the box C, works, and by which the box A can be moved away and fixed in that position, when the same is capable of turning around the pin of the lower end of the links L. A strap, v, is attached, some distance below the links L, to the box A, provided with a slot in which a pin, w, fast in the box C, works, and by which said pin w any position or inclination given to the box A can be secured and fixed, so as to make the box A swinging and adjustable in any desired position or inclination.

Instead of the above arrangement the same may be arranged as shown in Fig. VI, where a strap, a, is attached near the center of the box A, provided with a suitable slot, in which a pin or screw, h, fastened to the box C, works. This strap fits in a suitable recess in the side of the box C to prevent it from moving, and is provided with a segment, a', having a slot, into which a screw, k, screwed into the box A, works. The box A swings around the ends of this strap a, and any inclination given to the same can be securely fastened and fixed by means of the screw k.

Fig. III shows the manner of putting the boxes together for the purpose of transportation, and the position of the bed E when taken apart. The inner sides of the box C have suitable recesses arranged to allow the straps and heads of the screws *m* and *w* to pass freely into the same, so as to pack the camera in as small space as possible.

What we claim as our invention, and desire to secure by Letters Patent, is—

1. The construction of the box D to pass over the after end of the sliding bed E, in combination with a suitable screw, G, or its equivalent, substantially in the manner and for the purpose set forth.

2. The construction of the boxes A, D, and C, to allow the same to pass partly into the box D, when moved together in the manner and for the purpose set forth.

3. The arrangement of the links L and straps *n* and *v* with their screws *m* and *w* or the equivalent, to connect the box A with the box C, substantially in the manner and for the purpose described.

4. The arrangement and use of an adjustable swinging box, A, to which the plate-holder is fixed, operated in the manner and for the purpose set forth.

5. The side-way guide M, in combination with the guide N', or the equivalent, with suitable guiding blocks attached to the bottom of the box C, substantially in the manner and for the purpose hereinbefore set forth.

JOHN STOCK.
JACOB STOCK.

Witnesses:
HENRY E. ROEDER,
JOSEPH S. DE BARRY. (111)